INVENTORS
JOHN B. CHATTEN
CHARLES F. TEACHER
BY
Robert D. Sanborn
ATTORNEY

Nov. 2, 1965    J. B. CHATTEN ETAL    3,215,773
REDUCED BANDWIDTH DATA TRANSMISSION SYSTEM
Filed May 14, 1962    9 Sheets-Sheet 2

INVENTORS
JOHN B. CHATTEN
CHARLES F. TEACHER
BY
Robert D. Sanborn
ATTORNEY

Nov. 2, 1965         J. B. CHATTEN ETAL         3,215,773
REDUCED BANDWIDTH DATA TRANSMISSION SYSTEM
Filed May 14, 1962                              9 Sheets-Sheet 3

INVENTORS
JOHN B. CHATTEN
CHARLES F. TEACHER
BY
Robert D. Sanborn
ATTORNEY

Nov. 2, 1965      J. B. CHATTEN ET AL      3,215,773
REDUCED BANDWIDTH DATA TRANSMISSION SYSTEM
Filed May 14, 1962                    9 Sheets-Sheet 4

INVENTORS
JOHN B. CHATTEN
CHARLES F. TEACHER
BY
Robert D. Sanborn
ATTORNEY

Nov. 2, 1965    J. B. CHATTEN ETAL    3,215,773
REDUCED BANDWIDTH DATA TRANSMISSION SYSTEM
Filed May 14, 1962    9 Sheets-Sheet 5

INVENTORS
JOHN B. CHATTEN
CHARLES F. TEACHER
BY Robert D. Sanborn
ATTORNEY

INVENTORS
JOHN B. CHATTEN
CHARLES F. TEACHER
BY
Robert D. Sanborn
ATTORNEY

INVENTORS
JOHN B. CHATTEN
CHARLES F. TEACHER
BY
Robert D. Sanborn
ATTORNEY

FIG. 20.

United States Patent Office 3,215,773
Patented Nov. 2, 1965

3,215,773
REDUCED BANDWIDTH DATA TRANSMISSION SYSTEM
John B. Chatten and Charles F. Teacher, Philadelphia, Pa., assignors to Philco Corporation, Philadelphia, Pa., a corporation of Delaware
Filed May 14, 1962, Ser. No. 194,437
12 Claims. (Cl. 178—6.8)

The present invention relates to pictorial data transmission systems and more particularly to systems for transmitting high-detail pictorial data over a channel of limited video bandwidth.

Systems for transmitting fixed images from one point to another have been in commercial use for some time. Examples of such systems are facsimile and radiophoto systems employed by news gathering services to transmit news pictures rapidly from one city to another. The image scanning and reproducing portions of such systems have been developed to the point that 200 lines per inch resolution is well within the state of the art. Resolution of this order will permit the transmission of high quality photographs, maps, etc., with no noticeable loss in detail. However such systems generally require either a very wide video bandwidth or a relatively long time to transmit the images. It can be shown that the time-bandwidth product for such systems is directly proportional to the total area of the image multiplied by the maximum number of resolvable picture elements to be transmitted within any unit area of the image.

It is known that there is a high degree of redundancy present in most images and that savings in the time-bandwidth product can be achieved by selecting a scanning system which takes advantages of this redundancy. Considerable work has been done in minimizing the time-bandwidth in line scanning systems. However the increasing use of the radio spectrum space, the increase in the amount of data to be transmitted and the introduction of limited bandwidth space-to-earth communciation systems has shown the need for further substantial reductions in the time-bandwidth product required to transmit pictorial data.

OBJECTS

It is an object of the present invention to provide an improved image transmission system which will minimize the time-bandwidth product required to transmit high-detail pictorial data.

A further object of the present invention is to provide a system in which the time-bandwidth product is determined by the average detail in the image of be transmitted.

Still another object of the invention is to provide an image transmission system in which the total image transmission time is automatically determined by the total amount of detail present in the image to be transmitted.

SUMMARY

In general, these and other objects of the present invention are achieved by scanning the image in contiguous small areas and representing the signal derived from each area by a code signal having a complexity determined by the detail present in that area.

In any signal transmission system in which the transmission bandwidth is limited to B cycles per second, 2B is the maximum number of code elements per second that can be unambiguously resolved. Thus the minimum code interval for a system of bandwidth B is 1/2B seconds. This is generally referred to as the Nyquist interval of the system. One typical embodiment of the invention described in detail hereinafter employs three operational modes for the encoding of successive blocks of elements (typically five elements by five elements). If a block has little or no detail the average brightness of the block is transmitted as a single amplitude modulated pulse having a duration of one Nyquist interval. This achieves a maximum saving in transmission time. The saving is proportional to the number of elements per block. This is referred to hereinafter as Mode 1 operation. If the block contains one of a selected vocabulary of simple geometric patterns, information describing the nature and brightness of the pattern is transmitted by a short sequence of amplitude modulated code pulses each code pulse having a duration of one Nyquist interval. This is referred to hereinafter as Mode 2 operation. If the block of elements scanned has significant brightness variations which do not fall within the vocabulary for Mode 2 operation, the brightness level of each element of the block is transmitted independently. This may be considered to be a code having a number of code elements approximately equal to the number of elements in the block. Again, each code element would have a duration of one Nyquist interval. This is referred to hereinafter as Mode 3 operation.

DRAWINGS

For a better understanding of the present invention together with other and further objects thereof reference should now be had to the following detailed description which is to be read in conjunction with the accompanying drawings in which.

FIGS. 1–6

A typical encoder-decoder system will first be described very generally with reference to the general block diagrams of FIGS. 1 and 6 in order that the over-all organization of the invention may be understood. Thereafter a more detailed description will be given of certain of the circuit components shown in block form in FIGS. 1 and 6. Turning now to the block diagram of the encoder shown in FIGURE 1 it will be seen that a flying spot scanner tube 20 is positioned so that the screen thereof may be imaged on copy 22 by lens 24. The copy 22 is imaged on the photosensitive surface of photomultiplier tube 26 by a second lens 28. Photomultiplier tube 26 may receive the light reflected from an opaque copy or it may receive the light transmitted through a transparent copy, the former condition being illustrated in FIG. 1. Scan control 32 supplies appropriate scanning signals to the deflection yoke 34 and blanking signals to the intensity control 35 of flying spot scanner tube 20.

Figure 2:
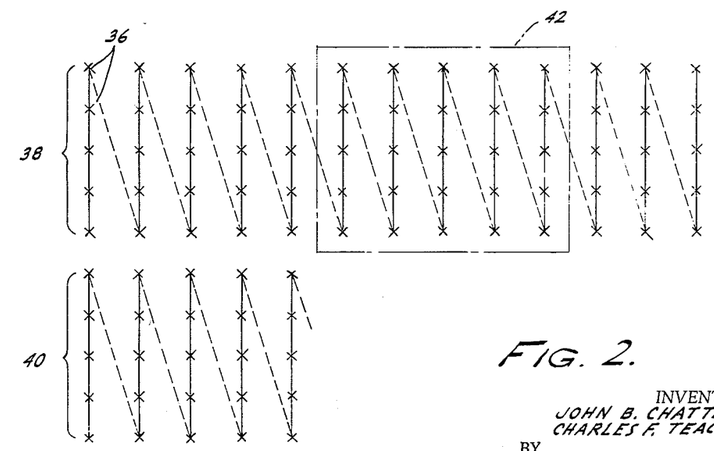
FIG. 2 is a graphic representation of the scan pattern of the system of FIG. 1.
Figure 14:
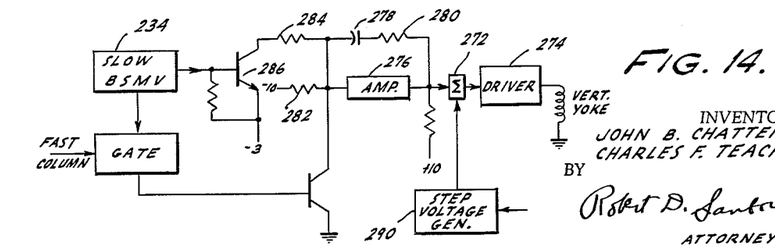

FIGURE 2 represents the nature of the scan produced by the signals supplied by scan control 32. Each one of the crosses 36 in FIGURE 2 represents one resolvable picture element. It will be seen that the copy 22 is scanned in successive columns of five picture elements each. After one horizontal row group 38 has been completely scanned the next horizontal row group 40 is scanned in a similar manner. Each row group comprises 5 rows of picture elements. The scan may be accomplished by appropriate deflection of the spot on flying spot scanner 20 or by motion of the copy 22 or by the combined deflection of the spot and motion of the copy 22. In one preferred embodiment of the invention (not shown), the beam of the flying spot scanner is deflected to scan a single horizontal row group such as row group 38 in FIGURE 2 while the slow vertical scanning between row groups 38, 40, etc. is accomplished by moving the copy 22. A system in which the entire scan is accomplished by the deflection of the beam of tube 20 is shown in FIGURE 14.

As will be described in more detail hereinafter, the scan control 32 provides signals for the different scan rates. In the fast scan rate an entire block of elements, such as block 42, is scanned in one Nyquist interval. In the slow rate, the same block of elements will be scanned in $n$ Nyquist intervals, where $n$ is the number of resolvable picture elements in the block 42. Thus if there are 25 resolvable picture elements within the block as shown at 42 in FIG. 2 the fast scan rate will be twenty-five times the slow scan rate. The scanning pattern is the same for the two rates.

To take a specific example, the transmission bandwidth of the data link may be 10,000 cycles per second. Thus the Nyquist interval of the system will be 50 microseconds. Since in Mode 1 operation five columns of elements are scanned in one Nyquist interval, the vertical column scan will have a duration of 10 microseconds or a rate of 100 kc. The vertical column scan rate for Mode 3 operation will be 4 kc., i.e. 250 microseconds duration. If it is assumed that there are 1600 resolvable elements 36 across the width of the copy 22 the horizontal sweep time per line will have a minimum duration of 16,000 microseconds if the entire row group is transmitted as Mode 1 and a maximum of 432,000 microseconds or 0.432 second if the row group is transmitted entirely as Mode 3 data. This includes the 32,000 microseconds required to transmit the Mode 3 identifying data. If the copy has an aspect ratio of 8 x 10 there will be 400 horizontal row groups to be scanned. Hence the time required to scan the entire copy (neglecting the short retrace time at the end of each horizontal row group) will be a minimum of 6.4 seconds and a maximum of 172.8 seconds. It is to be understood that the invention is not limited to the particular copy scanning means shown by way of example. Obviously the flying spot scanner 20 and photomultiplier tube 26 may be replaced by a television camera tube, a mechanical scanner or the like. Also the system to be described may be adapted to other forms of images such as magnetic images or electrostatic images by proper choice of scanning equipment.

The video signal output of photomultiplier tube 26 is coupled to a delay line 44. Delay line 44 has a delay equal to or greater than one Nyquist interval. In the following example it will be assumed that delay line 44 has a delay of one Nyquist interval. The output of delay line 44 is connected to one input of adder circuit 48 through a gate circuit 52. Adder 48 receives additional inputs from a Mode 2 code generator 54, a Mode 3 generator 56 and a synchronizing signal source 58. As will be explained in more detail presently, Mode 2 code generator 54 is a circuit for generating a multi-pulse code which is representative of the type and brightness of an area recognized as belonging to one of the Mode 2 vocabulary of the system. The Mode 3 code generator 56 is a circuit for generating a pulse code which indicates that the succeeding block is to be transmitted at the slow scan rate. Synchronizing source 58 may be a stable oscillator circuit which will supply synchronizing signals to the various elements of the combination of FIGURE 1 and similar synchronizing signals to the receiver by way of adder 48.

The output of photomultiplier tube 26 is also supplied to detail detector circuit 46. Detail detector 46 is provided with four outputs which are coupled respectively to gate 52, Mode 2 code generator 54, Mode 3 code generator 56 and scan control 32. One or more of these outputs of circuit 46 will be energized depending upon the nature of the signal received from photomultiplier tube 26 in any one Nyquist interval.

The signal appearing at output connection 62 of adder circuit 48 contains all the video and synchronizing data necessary to reproduce the image at the receiver. The output of 62 may be connected to the input of any suitable data link such as a radio transmitter-receiver link or wire line.

Figure 3:
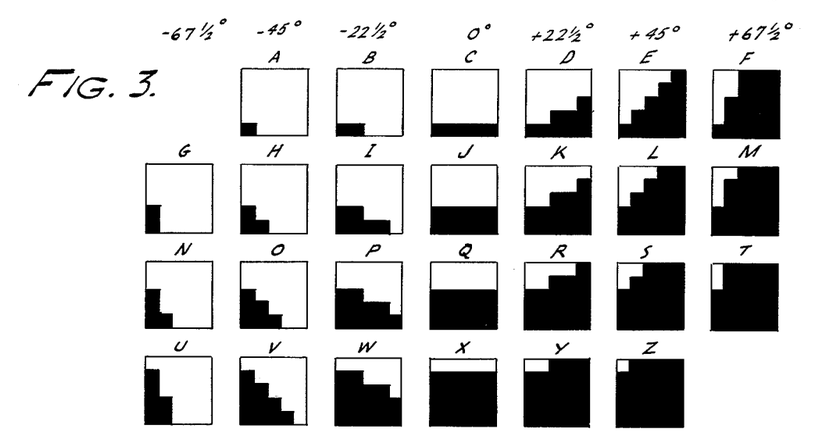
FIG. 3 is a pictorial representation of typical patterns in the vocabulary of the system of FIG. 1.
Figure 4:
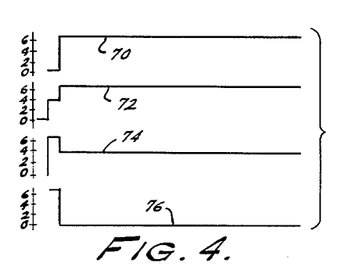
FIGS. 4 and 5 are series of waveforms corresponding to certain of the patterns shown in FIG. 3.
Figure 5:
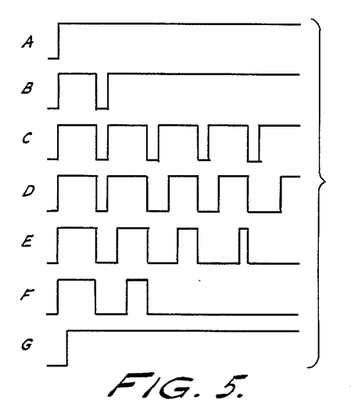

FIGURE 3 represents a typical vocabulary of patterns and FIGS. 4 and 5 represent corresponding waveforms produced by the scanning of these patterns. As will be explained in more detail later, in setting up the code which represents these patterns in Mode 2 operation the characters making up the vocabulary may be classified according to (a) the relative positions of the transitions in successive columns, (b) the brightness or reflectivity before the first transition and (c) the brightness or reflectivity following the first transition. Alternatively, the code may represent the position of the pattern in some arbitrarily selected list of patterns. The transitions need not be from black to white as shown in FIG. 3 but may be from one shade of gray to a second shade of gray, either darker or lighter. In a system in which circuits associated with photomultiplier tube 26 will recognize eight different brightness steps in the video signal there will be 56 possible transitions from one shade of gray to another. Thus while only 26 different patterns or characters are shown in FIG. 3 the vocabulary of the system is actually 26×56 or 1456 different patterns when possible brightness variations are considered.

FIG. 4 shows four of the 56 possible waveforms at the output of photomultiplier tube 26 which would result from the scanning of pattern A of FIG. 3. Waveform 70 of FIG. 4 represents the transition from level zero (black) to level 7 (white). Thus waveform 70 of FIG. 4 represents the specific pattern A of FIG. 3. Waveform 72 in FIG. 4 represents a transiiton from level 4 (medium gray) to level 7 (white). Waveform 74 represents a transition from level 7 (white) to level 4 (medium gray). Finally waveform 76 represents the transition from level 7 (white) to level zero (black). Thus the pattern represented by waveform 76 of FIG. 4 is the negative image of pattern A of FIG. 3.

FIG. 5 is a series of seven representative waveforms A–G corresponding to seven of the characters specifically shown in FIG. 3, that is, characters in which the transition is from level zero (black) to level 7 (white). Waveforms A–G in FIG. 5 correspond to the similarly identified characters of FIG. 3.

Figure 1:
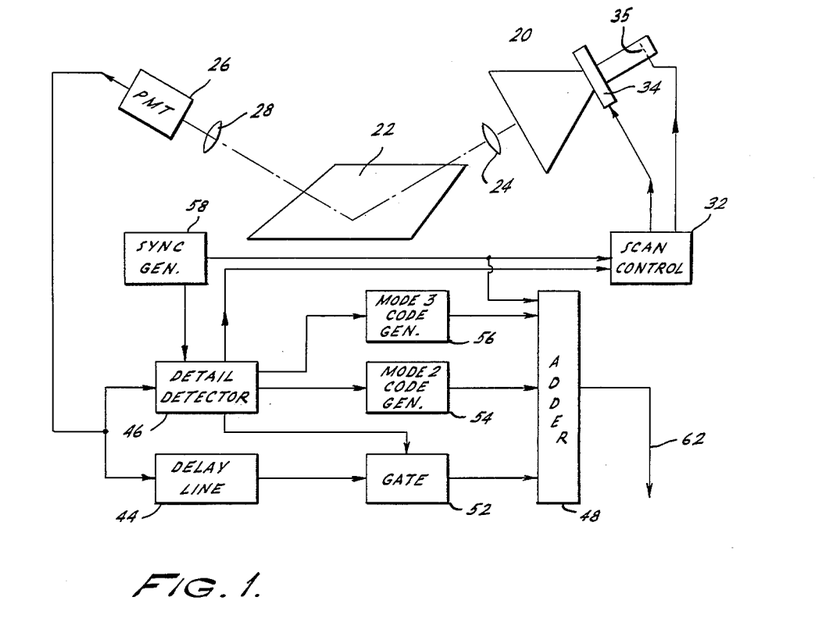
FIG. 1 is a general block diagram of the transmitter or encoder portion of the invention.

OPERATION—FIG. 1

The system of FIG. 1 operates in the following manner. Flying spot scanner 20 scans the copy 22 with the wobble scan pattern shown in FIG. 2. Photomultiplier tube 26 converts the light reflected by or transmitted through copy 22 to a video signal which is supplied to detail detector 46 and delay line 44. Scan control 32 is normally set to provide rapid scan signals so that 25 picture elements 36 within an area such as the area enclosed by broken line 42 are scanned in one Nyquist interval. Gate circuit 52 is normally conditioned to pass a signal. If the amplitude of the signal supplied by photomultiplier tube 26 in response to the scanning of the 25 picture elements within one block does not change faster than a preselected rate, no signal is supplied by detail detector 46 and the signal at the output of delay line 44 is supplied to adder 48 and hence to output 62. It should be understood that the limit on the rate of change of reflectivity for elements within one block is that rate which would cause the bandwidth of the video signals supplied by photomultiplier 26 to exceed the available bandwidth of the data link. Thus an image which contains no abrupt changes in reflectivity but only gradual changes from black to white or between two different shades of gray may be scanned entirely in Mode 1.

If a variation in brightness is detected by detail detector 46, i.e. if the signal supplied thereto varies by more than the preselected small amount in one Nyquist interval, a signal is sent to scan control 32 to stop the scan and a second signal is sent to gate circuit 52 which disconnects delay line 44 from adder circuit 48. The video signal represented by the block of 25 elements is compared with the stored vocabulary. If it corresponds to the signal representing one of the patterns in the vocabulary, Mode 2 code generator 54 generates the appropriate pulse code to represent this block of picture elements and transmits the pulse code to adder circuit 48.

If changes in amplitude level are present in the signal supplied by photomultiplier tube 26 to the input of detail detector 46 but this signal does not correspond to any one of the patterns of the stored vocabulary, a signal is sent to scan control 32 which causes the entire block of 25 elements to be rescanned at slow rate. At the same time a signal is sent to Mode 3 code generator 56. Generator 56 supplies a signal to adder 48 to indicate that Mode 3 transmission is being initiated. A signal is also sent to gate circuit 52 to permit the slow rate video data supplied by photomultiplier tube 26 to be supplied to adder 48.

At the end of a Mode 2 code pulse group or at the end of a Mode 3 scanning interval, scan control 32 is immediately restored to fast scan and the next 25 picture elements are scanned in one Nyquist interval. The resulting signal for that block is then transmitted in either Mode 1, Mode 2 or Mode 3 depending upon the presence or absence of the detail as registered by detail detector 46.

Figure 6:
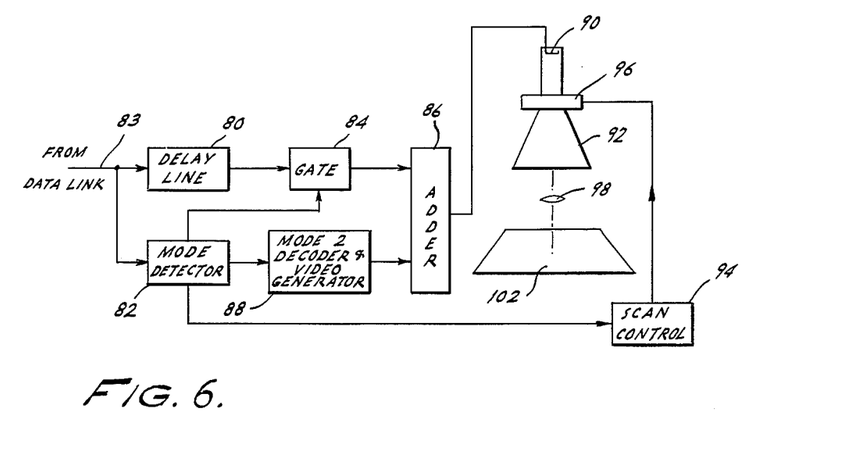
FIG. 6 is a general block diagram of the receiver or decoder portion of the invention.
Figure 6A:
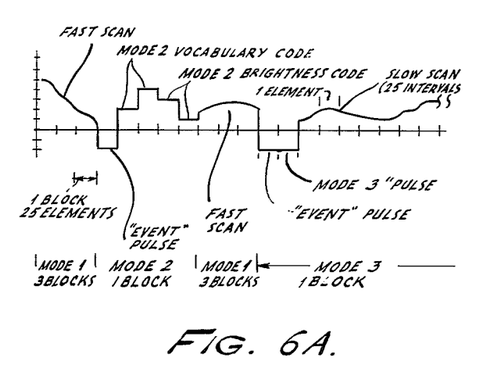
FIG. 6A is a waveform of a signal supplied by the system of FIG. 1.

FIG. 6A is a time versus amplitude plot of the signal supplied to output 62. This signal represents at successive times Mode 1, Mode 2, Mode 1 and Mode 3 operation. The manner in which the specific signal shown in FIG. 6A is generated will become clear as the description of the invention proceeds.

Since the signal present at output connection 62 of FIG. 1 is not a true video signal but is instead an encoded representation of successive areas of the copy, it is necessary to provide a suitable decoding circuit at the receiver. FIG. 6 is a general block diagram of an appropriate decoder circuit. The signal from the data link is supplied to delay line 80 and mode detector 82 in parallel by way of input 83. The output of delay line 80 is connected by way of gate circuit 84 to one input of adder circuit 86. Adder circuit 86 receives a second input from Mode 2 decoder and video generator 88. The output of adder 86 is coupled to an intensity control electrode, for example the cathode 90, of flying spot scanner tube 92. Scan potentials for flying spot scanner 92 are supplied by scan control 94 to deflection yoke 96. Scan control 94 includes the necessary circuits for providing both a fast and a slow zig-zag sweep of the type shown in FIGURE 2. The three outputs of mode detector 82 are coupled to gate 84, Mode 2 decoder 88 and scan control 94 to control the operation of these circuits. Lens 98 projects an image of the screen of tube 92 on a photographic film 102. Thus the output information of the system of FIG. 6 is the latent image on film 102.

OPERATION—FIG. 6

The system of FIG. 6 operates in the following manner. In the absence of any signal from the data links indicating Mode 2 or Mode 3 transmission the gate 84 is conditioned to pass a signal and scan control 94 is set to provide a fast sweep. The Mode 1 video data is supplied by way of circuits 80, 84 and 86 to the intensity control 90 of flying spot scanner tube 92. The fluorescent spot on the screen of cathode ray tube 92 will have a brightness corresponding to the amplitude of the received signal. Thus film 102 will be exposed to a degree dependent upon the reflectivity of the corresponding area of the original image.

Upon receipt of a signal by mode detector 82 indicating that Mode 3 transmission follows, a signal is sent to scan control 94 to set it to the slow sweep condition. A sampling gate signal having a duty cycle of $1/n$ where $n$ is again the number of elements in one block, is supplied to gate circuit 84 in order to maintain the exposure of film 102 proportional to the amplitude of the received signal even though the speed of scan of the beam of cathode ray tube 92 has been decreased by the factor $n$. At the end of a Mode 3 block the entire circuit automatically returns to Mode 1 operation.

Upon receipt of a signal indicating that Mode 2 transmission follows, scan control 94 initially stops the fast scan and then restarts it after a delay of several Nyquist intervals. The Mode 2 data is decoded in this interval by Mode 2 decoder and video generator 88. This circuit generates the necessary Mode 2 video signal when the fast sweep is resumed. Gate 84 is rendered inoperative by a signal from mode detector 82. Thus only Mode 2 video data is supplied by way of adder circuit 86 to cathode 90. Again at the end of a Mode 2 block the circuit is automatically restored in Mode 1 operation. This scanning is repeated block by block until the entire copy has been reproduced.

FIGS. 7–20

Figure 7:
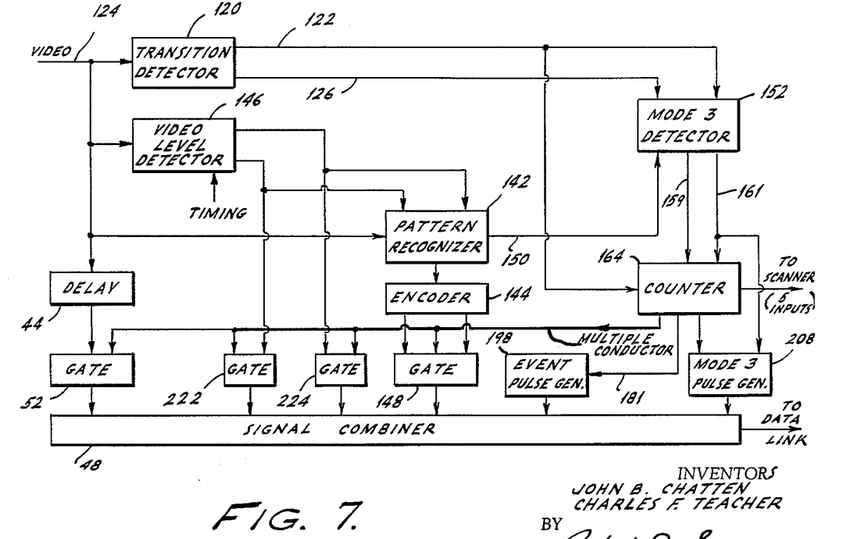
FIG. 7 is a more detailed block diagram of the system shown in FIG. 1 with the exception of the scanning and synchronizing circuits.

Reference should now be had to FIGS. 7–20 for a more detailed description of the operation of the encoder and the decoder. FIG. 7 is a more detailed block diagram of the encoder shown in FIGURE 1 with the exception of the photomultiplier tube 26, synch generator 58 and flying spot scanner 20 and associated circuitry. Elements in FIGURE 7 corresponding to similar elements in FIGURE 1 have been identified by identical reference numerals.

The transition detector 120 of FIGURE 7 forms a part of detail detector 46 of FIGURE 1. Transition detector 120 provides a signal on output connection 122 if the change in amplitude of the video signal on input connection 124 changes by more than a preselected amount in the time required to scan one element. Detector 120 provides a second signal on output lead 126 if the amplitude of the video signal changes by more than a preselected amount in the time required to scan one column.

Figure 8:
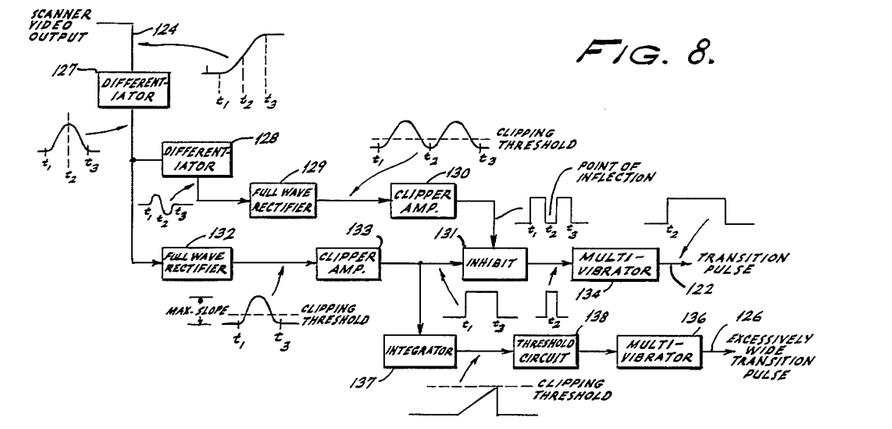
FIG. 8 is a detailed showing of the transition detector of FIG. 7.

FIGURE 8 is a detailed block diagram of a preferred form of transition detector circuit which will generate the two signals mentioned above. A typical transition from one video level to another is shown in the sketch adjacent video input lead 124 in FIGURE 8. Also shown are the waveforms which would appear at the output of each block of FIGURE 8 in response to the signal shown adjacent input lead 124. The timing marks $t_1$, $t_2$ and $t_3$ are merely for reference throughout the several waveforms of FIGURE 8.

The video signal present on lead 124 is supplied to a first differentiator circuit 127. The output of differentiator 127 is supplied by way of a second differentiator circuit 128, a full wave rectifier 129 and a clipper amplifier 130 in series to one input of inhibit gate 131. The output of differentiator 127 is also supplied by way of full wave rectifier 132 and clipper amplifier 133 to a second input of inhibit gate 131.

The operation of the circuit thus far described is believed to be obvious from the waveforms shown in FIGURE 8. The signal at the output of differentiator 127 is preferably clamped at zero in the absence of a transition. Gate 131 will normally pass a signal except when an inhibit signal is supplied by amplifier 130. Amplifier 130 supplies such an inhibit signal to the gate 131 for the duration of the transition except at the point of inflection in the transition. Clipper amplifier 133 supplies a pulse having a duration equal to the duration of the transition and an amplitude which is proportional to the slope of the transition for small slope angles and fixed at the limiting level of amplifier 133 for greater slopes. The limiting level of amplifier 133 is set so that the resulting pulse at the output of inhibit gate 131 will be of sufficient amplitude to trigger multivibrator 134 if the signal supplied by rectifier 132 is approximately equal to or is greater than the clipping level of amplifier 133. Monostable multivibrator 134 functions as an information storage device. The output lead 122 of multivibrator 134 corresponds to the similarly numbered lead in FIGURE 7.

The output of clipper amplifier 133 is coupled to a second monostable multivibrator 136 by way of integrator 137 and threshold circuit 138. Threshold circuit 138 passes only signals which exceed the selected threshold level. The constants of integrator 137 are selected so that the threshold level of circuit 138 is exceeded if the transition occupies a substantial portion of one column scan. For example integrator 137 and amplifier 138 together may provide an output signal if the transition occupies more than three of the five pulses making up a column. A signal at the output of threshold circuit 138 will trigger multivibrator 136. Again multivibrator 136 functions as an information storage device. The output lead 126 of multivibrator 136 corresponds to lead 126 in FIGURE 7.

Returning once more to FIG. 7 it will be seen that the video signal present on lead 124 is supplied also to a pattern recognizer circuit 142. The function of pattern recognizer circuit 142 is to provide an output signal which uniquely identifies which one of the patterns in the vocabulary is represented by the input signal if, in fact, the input signal represents one of the patterns. In addition an output signal is provided if no pattern is recognized. The pattern recognizer 142 may comprise a plurality of resistor-correlation masks of the type currently employed in alphanumeric character readers or the like. If this form of circuit is employed a differentiator input circuit should be employed. This is necessary since the signal representing this block may have any value from zero for a black area to the maximum amplitude representing a white area. By differentiating this signal an on-off signal is obtained which represents the positions of the transistions and is not affected by the absolute levels before and after the transition. Alternatively a matrix type recognizer may be employed which identifies the pattern as (a) a pattern selected from a particular row and (b) a pattern selected from a particular column. For example the patterns of FIGURE 3 are arranged in rows in accordance with the position of the first transition in the first column of the block. The patterns of FIGURE 3 are arranged in columns in accordance with approximate angle with the horizontal of a line joining the transitions in the five columns of the block. Both the position of the first transition and the angle of the transition may be identified in accordance with conventional computer practice by employing sequentially gated register circuits to detect and store the positions of the transitions in each column and suitable logic circuits to indicate the relationship of the recorded transistions in the several columns. For example, the angle of $-67\frac{1}{2}°$ is uniquely identified by the following three sets of conditions (1) A transition between elements 2 and 3 of column 1; no transitions in columns 2–5.

(2) A transition between elements 3 and 4 of column 1 and a transition between elements 1 and 2 of column 2 and no transition in columns 3, 4 and 5.

(3) A transition between elements 4 and 5 of column 1 and between elements 2 and 3 of column 2 and no transitions in columns 3, 4 and 5.

Encoder circuit 144 of FIGURE 7 comprises means for generating a multi-pulse code which uniquely represents the recognized pattern. The 26 patterns shown in FIGURE 3 may be represented by two sequential pulses each having one of seven possible levels. It should be understood at this point that the signal provided by pattern recognizer 142 and encoder 144 represent only the patterns shown in FIGURE 3 without regard to the relative brightness or reflectivity of the areas represented as white and black in FIGURE 3. As will be explained in more detail presently, information as to the relative brightness of these two areas is provided by video level detector 146 of FIGURE 7. The output signals of encoder 144 are supplied by way of gate circuit 148 to the signal combiner circuit 48. Pattern recognizer 142 is also connected by way of connection 150 to Mode 3 detector circuit 152. As will be explained in more detail presently, lead 150 is energized if the video signal supplied to pattern recognizer 142 does not correspond to any one of the selected patterns of the vocabulary.

Figure 9:
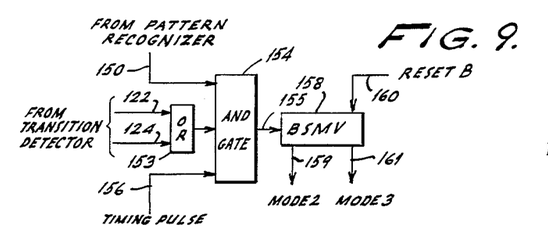
FIG. 9 is a detailed showing of the Mode 3 detector of FIG. 7.

FIG. 9 is a more detailed block diagram of the Mode 3 detector circuit 152. As shown in FIGURE 9 this circuit 152 comprises an "or" gate 153 which supplies an output signal if either lead 122 or lead 126 from transition detector 120 is energized. The output of "or" gate 153 is connected to one input of "and" gate 154 which supplies an output signal on lead 155 only if signals are received simultaneously on input lead 150 from pattern recognizer 142, from "or" gate 153 and from a third input 156. The signal on input 156 is a timing pulse which is derived from synch generator 58 of FIG. 1. A bistable multivibrator 158 is normally reset by a signal supplied by way of connection 160 so that Mode 2 output 159 is energized. A signal on input lead 155 will trigger multivibrator 158 to its second or triggered stable state. This will energize output lead 161 and de-energize output lead 159.

Figure 10:
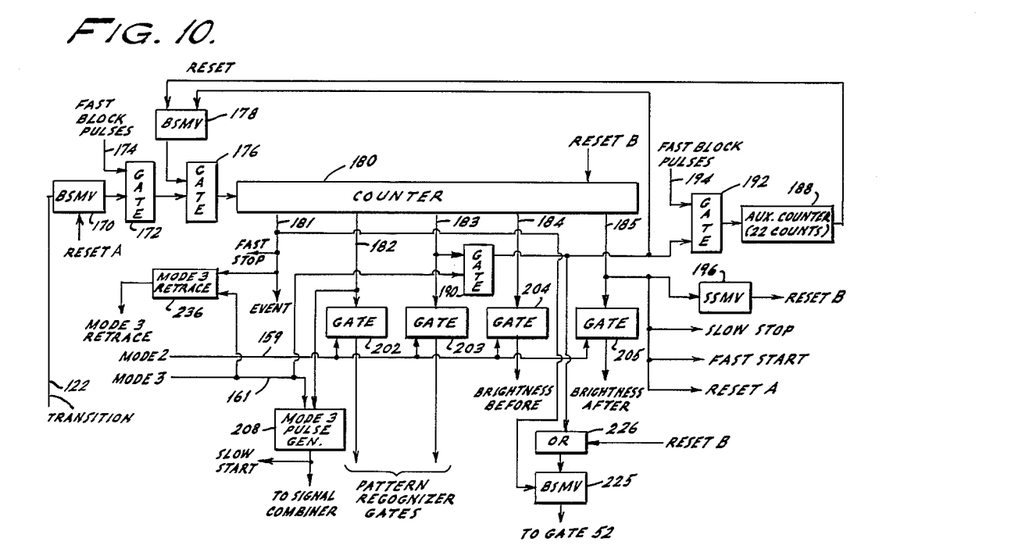
FIG. 10 is a detailed block diagram of the counter circuit of FIG. 7.

Counter circuit 164 in FIGURE 7 receives signals from transition detector output lead 122 and leads 159 and 161 from Mode 3 detector 152. Counter circuit 164 is shown in more detail in FIGURE 10. As shown in FIGURE 10 transition detector output connection 122 is supplied to an input of bistable multivibrator 170. Again multivibrator 170 is employed as a data storage element. The output of bistable multivibrator 170 is supplied to one input of gate circuit 172. A second input 174 of gate circuit 172 is supplied with timing pulses which occur at intervals corresponding to the time required to scan one block at the fast rate. For example these pulses may occur 50 microseconds apart. These and other timing pulses employed throughout the system are supplied by synch generator 58 of FIG. 1. With multivibrator 170 in its reset state the clock pulses present on lead 174 are not allowed to pass through gate 172. However with multivibrator 170 in its triggered state the clock pulses on lead 174 will pass through gate 172 to one input of "and" gate 176. A second input of gate 176 is supplied by bistable multivibrator 178. Counter circuit 180 is a conventional stepping counter in which the outputs 181–185 are energized in sequence, each output remaining energized until the succeeding one is energized.

Bistable multivibrator 178 is reset by the output of an auxiliary counter 188. In its reset condition it supplies a signal to gate 176 which permits the gated clock pulses to pass to counter 180. Multivibrator 178 is triggered to its second stable state by a signal supplied from output tap 183 by way of two input "and" gate circuits 190. The second input of "and" gate circuit 190 is connected to the Mode 3 input line 161 from the Mode 3 detector 152 of FIGURE 7.

The output of "and" gate 190 is also connected to one input of two input "and" gate circuits 192. Clock pulses of the same frequency as those supplied to input 174 of gate 172 are supplied to input 194 of gate 192. The output of gate 192 is connected to the input of auxiliary counter 188.

It will be seen from FIGURE 10 that if input 122 is energized so that multivibrator 170 is in its triggered state but no Mode 3 signal is generated by detector 152, counter 180 will proceed in its normal fashion and count through five successive counts at the rate determined by pulses supplied at input 174. A single shot multivibrator 196 is coupled to the output 185 of counter 180 and generates a reset pulse near the end of the final counting interval for counter 180. At the end of the fifth counting interval counter 180 will be reset by the signal from multivibrator 196. The timing of the circuit would be simplified if the start of the scan were delayed until the termination of a Mode 2 or Mode 3 interval. However this would result in one Nyquist interval following each such Mode 2 and Mode 3 interval in which no data would be transmitted. To avoid this fast scanning is reinitiated one Nyquist interval before the end of a Mode 2 or Mode 3 interval. This requires that certain of the circuits be reset immediately upon the energization of output 185 while other circuits are not reset until one Nyquist interval later to permit the complete transmission of Mode 2 and Mode 3 data. These two reset signals are referred to herein as Reset A and Reset B respectively.

If multivibrator 170 is in its triggered state and a Mode 3 signal is supplied on input 161, gate 190 is activated. When output lead 183 is energized multivibrator 178 is set to its triggered state and interrupts the flow of clock pulses to counter 180. This stops counter 180 at the third count. At the same time the output of gate 190 activates gate 192 and permits the fast block pulses present on input 194 to be supplied to auxiliary counter 188. At the end of 22 additional timing pulses auxiliary counter 188 resets multivibrator 178 thus permitting resumption of timing pulses at the input of counter 180. After two more clock pulses output 185 will be energized and a reset pulse will be generated by multivibrator 196 as before. Thus it will be seen that a reset pulse is generated after 5 clock pulses for Mode 2 operation and after 27 clock pulses for Mode 3 operation.

Output 181 of counter 180 is supplied directly to event pulse generator 198 of FIGURE 7. No further gating is required since the event pulse or transition indicating pulse is generated for both Mode 2 and Mode 3 operation.

Output connections 182–185 are connected to two-input "and" gates 202–205 respectively. A second input of each of "and" gates 202–205 is connected to Mode 2 input line 159. Thus gates 202–205 will pass signals from counter 180 only when a Mode 2 signal is provided by Mode 3 detector 152.

Output connections of gates 202 and 203 are connected to gate 148 associated with pattern recognizer 142 in FIG. 7. Thus the signals provided by gates 202 and 203 permit the multilevel pulses supplied by encoder 144 to be supplied in succession to signal combiner 48.

Output 182 of counter 180 and Mode 3 input 161 are both connected to a Mode 3 pulse generator 208. Pulse generator 208 is also shown in FIGURE 7. The remaining connections in FIG. 10 will be described presently.

Figure 11:
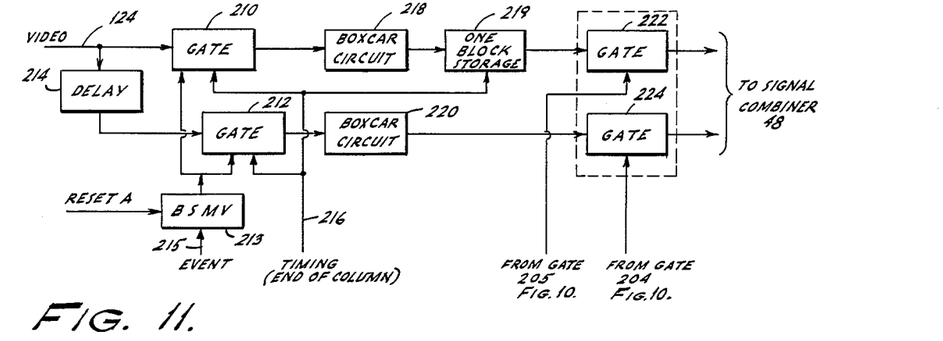
FIG. 11 is a detailed diagram of the video level detector circuit of FIG. 7.

FIGURE 11 is a detailed block diagram of the video level detector shown at 146 in FIGURE 7. The video signal present on lead 124 is supplied directly to one input of "and" gate 210. This video signal is supplied to one input of "and" gate 212 through delay circuit 214. Delay circuit 214 has a delay equal to the time required to scan one column less one element. In the example chosen for illustration herein delay 214 has a delay equal to ⅘ of the time required to scan one column. The timing pulses supplied to inputs 216 of gates 210 and 212 have a duration equal to the scanning time of one element and occur during the scanning of the last element of the column. The timing pulses are supplied to leads 216 once per block during the scanning of the last element of the first column. Thus the output signals of gates 210 and 212 represent the video signal occurring in the last element of the first column and the first element of the first column respectively. Enabling signals for gates 210 and 212 are supplied by bistable multivibrator 213. Gates 210 and 212 will pass signals if multivibrator 213 is in its reset condition. The reset signal is obtained from output 185 of counter 180. The input 215 of multivibrator 213 is energized by output 181 of counter 180. The outputs of gates 210 and 212 are connected to boxcar circuits 218 and 220 which function as signal storage devices. The outputs of boxcar circuits 218 and 220 are connected to signal combiner 48 of FIGURE 7 by way of "and" gate circuits 222 and 224 respectively. The connection between boxcar circuit 218 and gate 222 contains a one block signal storage circuit. This may be a second boxcar circuit for example. This signal storage is made necessary by the fact that the information supplied by circuit 218 is utilized in the last interval of the Mode 2 code. The fast sweep is resumed at the start of this interval so that delayed video data will be available at the output of delay line 44 at the termination of the Mode 2 signal. Second inputs of gates 222 and 224 are connected to gates 205 and 204, respectively, of FIGURE 10. In the event that Mode 2 operation is indicated, gates 224 and 222 are actuated in that sequence to gate signals representative of the video level of the first element of the first column and the last element of the first column to the signal combiner 48. It will be seen from FIGURE 3 that, since there is a transition in the first column of each recognizable pattern, one of the signals supplied by gates 222 and 224 will represent the brightness of the lighter area of the recognizable pattern while the other signal will represent the brightness level of the darker area of the recognizable pattern.

The control signal for gate 52 is supplied by bistable multivibrator 225 of FIG. 10. Multivibrator 225 is triggered at the start of either a Mode 2 or Mode 3 interval of the start of the pulse at output lead 181 of counter 180. Multivibrator 225 is supplied with a reset pulse from multivibrator 196 by way of "or" gate 226. The output of gate 190 is supplied to a second input of "or" gate 226. Thus multivibrator 225 will be reset at the end of two Nyquist intervals for Mode 3 operation by the signal supplied by gate 190. For Mode 2 operation multivibrator 225 will be reset after five Nyquist intervals by the signal supplied by multivibrator 196.

Figure 12:
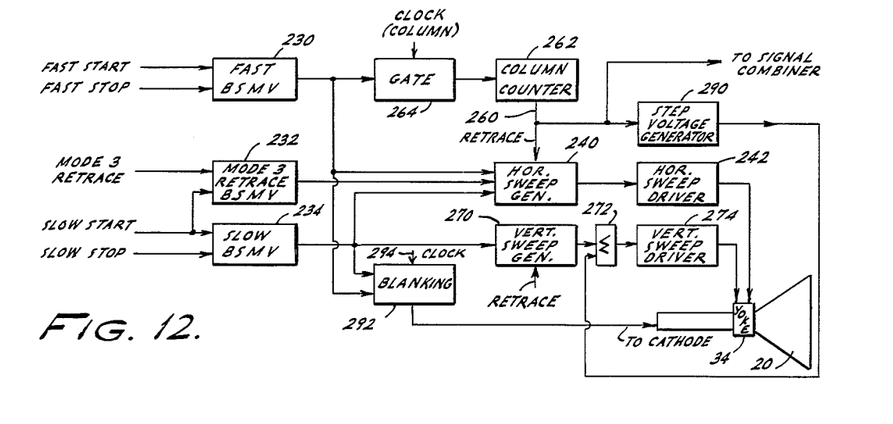
FIG. 12 is a detailed block diagram of the sweep circuits of FIG. 1.

FIGURE 12 is a more detailed block diagram of the flying spot scanner circuitry shown in FIGURE 1. The sweep speed and direction of scan for cathode ray tube 20 are controlled by three bistable multivibrators 230, 232 and 234. Multivibrators 230, 232 and 234 receive control signals from output connections 181, pulse generator 208 and output 185 of FIGURE 10. These connections are labeled "fast stop," "slow start," and "slow stop" in FIGURES 10 and 12. As will be explained in more detail presently with all three multivibrators 230, 232 and 234 in the "reset" condition the scanning by flying spot scanner 20 is interrupted. This occurs during Mode 2 operation.

Multivibrators 230 and 234 receive signals which cause them to assume the "triggered" state from output 185 and gate 208 of FIGURE 10. It should be noted that these inputs are labeled "fast start" and "slow start" in FIGURES 10 and 12. It will be noted that the "slow stop" and "fast start" signals are obtained from the same point in the circuit. Also the "slow start" signal for multivibrator 234 and the "reset" signal for multivibrator 232 are obtained from the same point. As shown in FIGURE 10 the Mode 3 retrace signal for multivibrator 232 is obtained from gate 236. Gate 236 receives one signal from output 181 and a second signal from Mode 3 bus 161.

As will be explained in more detail presently only one of the multivibrators 230, 232 and 234 is in the triggered state at any time. If multivibrator 230 is in the triggered state the spot on flying spot scanner 20 is caused to scan an entire block in one Nyquist interval. If multivibrator 232 is in its triggered state the sweep is caused to retrace one block in the reverse direction in one Nyquist interval. If multivibrator 234 is in its triggered state the sweep is caused to scan one block at the slow rate which requires 25 Nyquist intervals.

The horizontal sweep signals for cathode ray tube 20 are generated by horizontal sweep generator 240 and are supplied to yoke 34 by way of horizontal sweep driver 242. As shown in more detail in FIGURE 13 horizontal sweep generator 240 comprises a Miller integrator circuit which includes an amplifier 244 and a feedback capacitor 246 connected between the output and input of amplifier tube 244. Resistor 245 is a discharge current limiting resistor.

Figure 13:
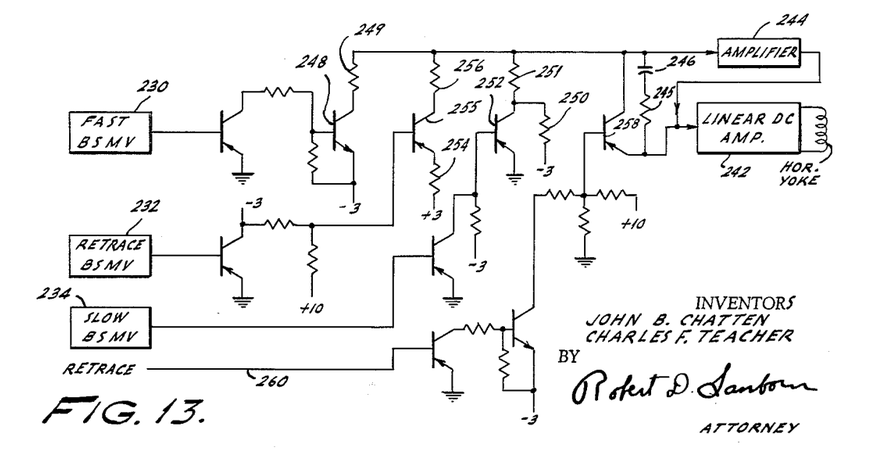
FIGS. 13 and 14 are schematic diagrams of the circuits shown in block form in FIG. 12.

The outputs of multivibrators 230 and 234 are at ground when in the reset condition and are negative when in the triggered condition. The output of retrace multivibrator 232 is negative when in the reset condition and at ground when in the triggered condition. The charging current for the integrator circuit 244–246 on fast sweep is obtained from negative voltage source by way of n-p-n transistor 248 and resistor 249. The output of multivibrator 230 is at ground potential for the reset condition and at a negative potential for the triggered condition. Thus it will be seen that charging current is permitted to flow through resistor 249 only when multivibrator 230 is in its triggered condition. Similarly charging current for the integrator circuit 244–246 for slow sweep is obtained from the negative source by way of resistors 250 and 251. Resistor 251 has an impedance approximately 25 times that of resistor 249. For example resistor 249 may have a resistance of 6,000 ohms and resistor 251 a resistance of the order of 150,000 ohms. Resistor 250 has a relatively small impedance, for example of the order of 1,000 ohms. The output of multivibrator 234 is at ground potential when the multivibrator is in its reset condition and is negative when the multivibrator 234 is in its triggered condition. If multivibrator 234 is in its reset condition transistor 252 is turned on and the collector of this transistor is held at approximately ground potential. Thus no current will flow to the integrator circuit 244–246. If multivibrator 234 is in its triggered condition transistor 252 is cut off and current is permitted to flow from the negative source through resistors 250 and 251 to the integrator circuit 244–246.

The Mode 3 retrace is accomplished by a circuit which resembles the fast sweep circuit. Charging current for the integrator 244–246 is supplied from a positive source by way of resistor 254, transistor 255 and resistor 256. The output connection of retrace bistable multivibrator 232 is normally at a negative potential for the reset condition. Therefore transistor 255 is normally cut off for the reset condition of multivibrator 232. However if multivibrator 232 is in its triggered state transistor 255 is turned on.

A transistor 258 is connected in shunt with capacitor 246 to discharge this capacitor at the end of a horizontal sweep. Transistor 258 is turned on by a negative end of line signal on retrace input 260.

As shown in FIGURE 12 the retrace signal on lead 260 is supplied by a counter circuit 262 which receives gated clock pulses from gate circuit 264. One input of gate circuit 264 is supplied by multivibrator 230. The second input is supplied with clock pulses occurring at the column frequency for the fast sweep. As will become clear presently regardless of the mode of transmission employed for the various areas of the image the entire image is completely scanned without overlap at the fast rate. Therefore the number of pulses passed by gate circuit 264 is an accurate representation of the position of the horizontal scan.

The five-element vertical deflection of the beam of flying spot scanner 20 is provided by vertical sweep generator 270 which supplies its output to yoke 34 by way of adder circuit 272 and vertical sweep driver 274.

As shown in FIGURE 14 the vertical sweep generator comprises an integrator employing an amplifier 276, a capacitor 278 and a resistor 280 which corresponds to elements 244, 246 and 245 of FIGURE 13. The integrator charging current for the slow sweep is provided from a negative source by way of resistor 282. Resistor 282 may have an impedance of the order of 1.5 megohms. The fast sweep is provided by shunting resistor 282 by a second resistor 284 and transistor 286 in series. Transistor 286 is turned on when fast sweep is desired and is turned off when slow sweep is desired. It is to be understood that the circuit thus far described produces the small amplitude vertical sweep which covers the heighth of one block only. The sweep which causes the path of flying spot scanner 20 to advance from one line to the next is provided by step voltage generator 290. Step voltage generator 290 receives an input signal from the output of column counter 262 and supplies its output signal to a second input of adder circuit 272. The step voltage generator advances the output voltage one step in response to each output signal from counter 262. This advances the sweep to the next horizontal row group. Blanking gate generator 292 in FIGURE 12 provides blanking signals to the cathode of cathode ray tube 20. Timing pulses are supplied to input 294 of blanking circuit 292. These timing pulses cause the beam to be turned off during the column scan retrace. A connection is provided between slow bistable multivibrator 234 and blanking circuit 292 to change the blanking rate when the sweep circuits 270 and 240 are set for slow scan. A connection is also provided from fast bistable multivibrator 230. This signal together with the one from slow bistable multivibrator 234 causes the beam to be blanked during the entire period that the sweep is stopped and during the Mode 3 retrace time. Blanking of the sweep during the time that the sweep is stopped makes it unnecessary to interrupt the vertical column sweep provided by vertical sweep generator 270.

Figure 15:
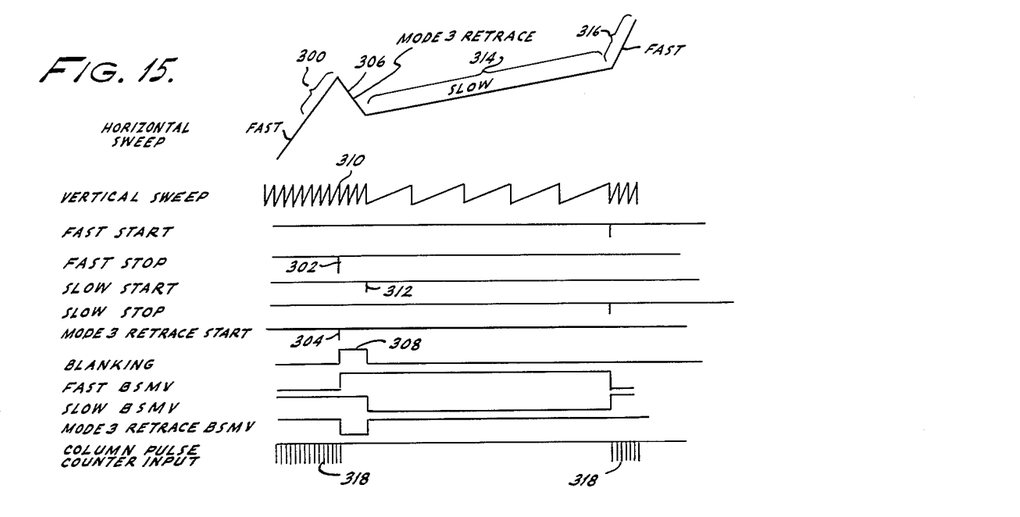
FIG. 15 is a series of waveforms which are illustrative of the operation of the circuits shown in FIGS. 12–14.

FIGURE 15 shows typical waveforms which may be present in the circuits of FIGURES 12, 13 and 14. It is assumed that a transition is detected somewhere in the region represented by the horizontal sweep segment 300. As shown in FIGURE 15 the horizontal sweep completes the block at the fast rate. It is assumed in FIGURE 15 that no pattern is recognized so that the system switches from Mode 1 to Mode 3 operation. At the end of block 300 in which the transition occurred a fast stop pulse 302 is generated which stops the horizontal sweep. A Mode 3 retrace pulse 304 is generated which causes the horizontal sweep to retrace along path 306. A blanking pulse 308 prevents the transmission of video data during this retrace interval. For this reason it is unnecessary to interrupt the fast vertical sweep 310. At the end of one Nyquist interval a slow start signal 312 is generated which interrupts the Mode 3 retrace and initiates the slow horizontal sweep. The vertical sweep is also switched from its fast rate to a slow rate.

During interval 314 the same area of the copy is scanned as was scanned during interval 300. However the scanning is at the slow rate. It will be noted that the fast scan represented by segment 316 of the horizontal sweep starts at the same point on the copy as the termination of segment 300. Therefore it will be seen that the entire copy is scanned entirely at the fast rate without overlap although portion of the video data generated by this fast sweep is not utilized. Since column counter 262 of FIGURE 12 is enabled whenever the horizontal sweep generator is in its fast sweep condition, the column pulses 318 of FIGURE 15 accurately represent the number of columns scanned by the system.

Figure 15A:
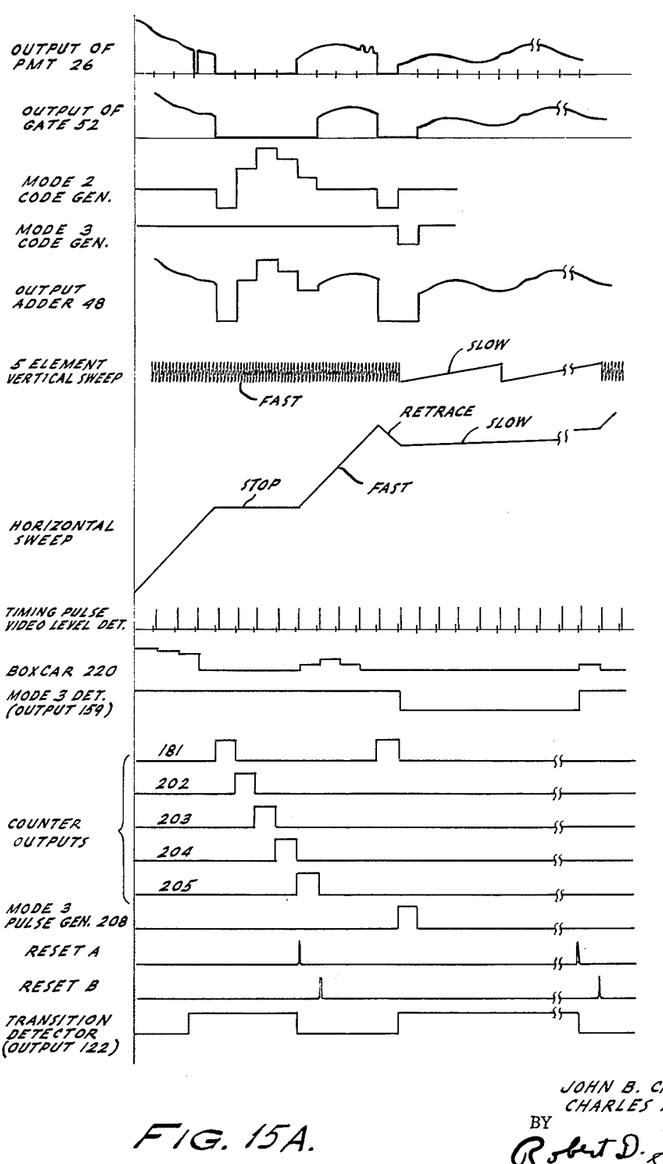
FIG. 15A is a series of waveforms illustrative of the operation of the circuit shown in FIG. 7.

FIGURE 15A is a series of waveforms which are present at representative points in the system of FIG. 7. It is assumed that the copy scanned is the same as the copy which resulted in the signal shown in FIG. 6A. As will be seen from the waveform A of FIG. 15A a transition occurs in interval $I_1$ which is assumed to correspond to a pattern stored in the Mode 2 vocabulary. A second transition is assumed in interval $I_2$. It is assumed that the pattern scanned in this interval does not correspond to a pattern in the Mode 2 vocabulary. Since the beam of the flying spot scanner is blanked following a transition the output of the photomultiplier tube 26 drops to zero. Since the cathode ray beam is blanked it is not necessary to stop the vertical sweep. This is illustrated in waveform F. Waveform G illustrates the stopping and starting of the horizontal sweep for Mode 2 operation and the stopping, retrace and restarting of the sweep at the slow rate for Mode 3 operation. It should be understood that the portion of the copy scanned during interval $I_3$ and the following 24 intervals is the same as that scanned at the fast rate during the single interval $I_2$. The remainder of FIG. 15A is believed to be self-explanatory.

Figure 16:
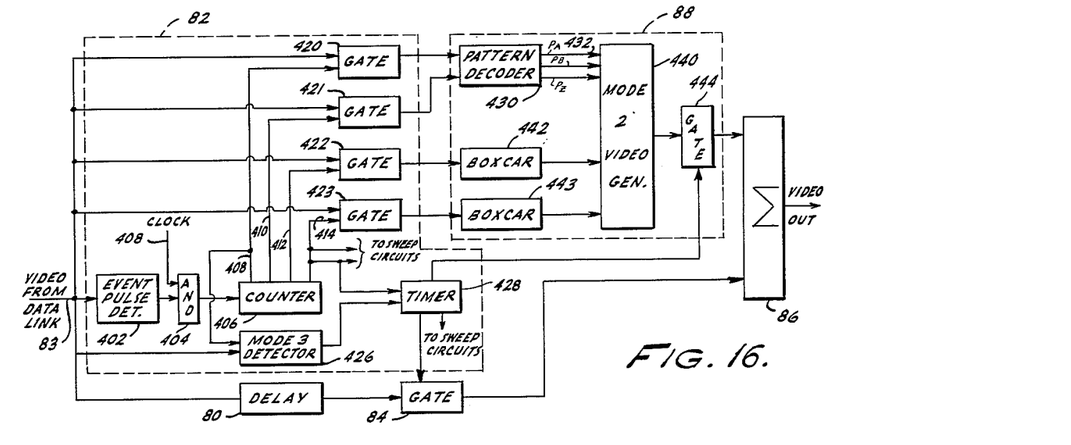
FIG. 16 is a detailed block diagram of the receiver circuit shown in FIG. 6.

FIGURE 16 is a more detailed block diagram of the receiver circuit in FIGURE 6. Like parts in FIGURES 6 and 16 have been identified by the same reference numerals. As explained above, the function of the receiver circuit shown in FIGURE 16 is to generate signals for cathode ray tube 92 of FIGURE 6 which will cause the beam of the cathode ray tube to reproduce the image represented by the signal supplied by signal combiner 48 of FIGS. 1 and 7. The circuits enclosed within the broken line rectangle 82 of FIGURE 16 correspond generally to the circuits represented by Mode Detector block 82 of FIGURE 6. Similarly the circuits enclosed within broken rectangle 88 correspond to the Mode 2 Detector and Video Generator 88 of FIGURE 6. As shown in FIGURE 16, the signal on input 83 from the data link is supplied to an event pulse detector 402. Event pulse detector 402 provides a signal having a duration of 5 Nyquist intervals in response to the reception of the negative event pulse from input 83. One preferred form of event detector circuit comprises a negative threshold circuit which passes only signals which become more negative than a preselected value. This threshold circuit in followed by a single-shot multivibrator circuit which produces a pulse having a duration of 5 Nyquist intervals.

The output of detector 402 is supplied by way of "and" gate 404 to an input of counter circuit 406. The second input of "and" gate 406 is supplied with clock pulses on input lead 408. These clock pulses recur at the fast block rate. That is, there is one pulse per Nyquist interval. Counter 406 is a conventional stepping counter which steps through five counts and then resets to zero in response to successive pulses supplied by "and" gate circuit 404.

The output connection 408 of counter 406 is energized at the start of the interval following the event pulse, i.e. in the second Nyquist interval of Mode 2 transmission and remains energized until the start of the third Nyquist interval of Mode 2 transmission. Similarly output connections 410, 412 and 414 are energized at the start of the third, fourth and fifth Nyquist intervals of Mode 2 transmission and remain energized for one Nyquist interval.

The input connection 83 is also connected to one input of each of the four two-input "and" gates 420–423. Gates 420–423 are activated in sequence by the signals supplied by outputs 408, 410 and 412, and 414, respectively of counter circuit 406. Turning once again to FIGURES 6A and 15A it will be seen that, if Mode 2 data is being transmitted, the output signals of gates 420 and 421 will represent the first and second pulses of the pattern recognition code. As explained above these are multi-level pulses which together represent one of the 26 patterns of the vocabulary shown in FIGURE 3.

Again if Mode 2 data is being transmitted the outputs of gates 422 and 423 will represent the brightness of the first element of the first column of the block represented by the Mode 2 signal while the output of gate 423 will represent the brightness of the last block in the first column. For convenience these signals are referred to hereinafter as the brightness before transition and the brightness after transition.

Mode 3 detector circuit shown at 426 may include an "and" gate circuit which responds to the negative Mode 3 pulse and the gate signal supplied by output 408 of counter 406. Detector 426 also includes a signal storage circuit such as one-shot multivibrator which provides an output signal having a duration of five Nyquist intervals. The output of Mode 3 detector 426 and output 410 of counter 406 are supplied to timer circuit 428. Timer circuit 428 is shown in more detail in FIGURE 17. The timing function of the receiver is somewhat simpler than the timing function at the transmitter owing to the fact that it is possible to determine in advance from the signals supplied by the data link whether the next area is to be reproduced in Mode 2 or Mode 3 operation. Therefore no retrace circuits are necessary. Also the event pulse occurs at a fixed time with respect to the clock interval of the system. As will be explained in more detail in connection with FIGURE 17 the necessary timing signals for circuits corresponding to scan control 94 of FIGURE 6 are provided by counter circuit 406 and timer 428. Timer 428 also supplies the necessary control signal to gate 84 to permit the entire delay video signal to be supplied to adder 86 on Mode 1 operation and to permit the sample video signal to be supplied to adder 86 on Mode 3 operation.

Figure 18:
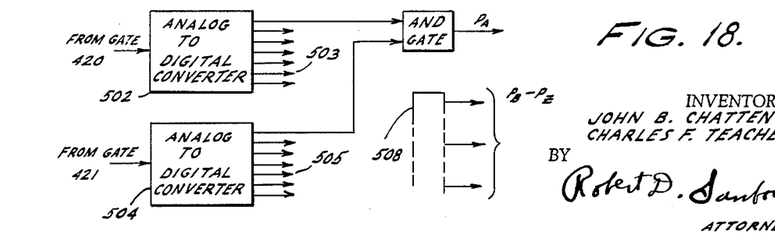
FIG. 18 is a detailed diagram of a representative portion of the pattern decoder of FIG. 16.

Turning now to the circuit enclosed within broken line rectangle 88 it will be seen that the outputs of gates 420 and 421 are supplied to a pattern decoder 430. Pattern decoder 430 energizes a single one of the 26 output connections 432 which are identified in FIGURE 16 as outputs $P_A$–$P_Z$, the subscripts referring to the patterns A through Z of FIGURE 2. A more detailed showing of a representative portion of pattern decoder 430 is shown in FIGURE 18.

The outputs of 432 of pattern decoder 430 are supplied to a Mode 2 video generator 440. Video generator 440 is shown in more detail in FIGURE 19.

The outputs of gates 422 and 423 are supplied by way of boxcar circuits 442 and 443 to additional inputs of video generator 440. Boxcar circuits 442 and 443 are signal storage devices which store the video brightness informtaion supplied by gates 422 and 423.

The output of video generator 440 is supplied by way of gate circuit 444 to a second input of adder circuit 86. The control signal for gate 444 is supplied by way of timer circuit 428.

As explained in connection with FIGURE 6 true video data is supplied from input 83 through delay line 80 and gate 84 to adder 86 during Mode 1 operation. True video data is also supplied from input 83 through delay line 80 and gate 84 to adder 86 during Mode 3 operation. However this Mode 3 video data is sampled with a duty cycle of $\frac{1}{25}$ to maintain the correct exposure on negative 102. During Mode 2 operation a synthesized video signal is supplied by video generator 440 to adder 86. Thus adder 86 is an "or" gate circuit which passes either the signal from gate 84 or the signal from gate 444 to the intensity control electrode 90 of cathode ray tube 92 shown in FIGURE 6.

The deflection circuits for cathode ray tube 92 are not shown in FIGURE 16. These circuits may be identical to the circuits shown in FIGURES 13 and 14 with the exception that the Mode 3 retrace circuits may be omitted from the horizontal sweep circuits.

The receiver timing circuits will now be described in more detail in connection with the description of FIGURE 17. The output 414 of counter 406 is connected to one input of "and" gate 450. "And" gate 450 receives a second input from Mode 3 detector 426. The output of "and" gate 450 is supplied to the input of a Mode 3 timer circuit 452. Timer circuit 452 is a circuit which will produce an output pulse having a duration of 25 Nyquist intervals. This circuit may be a single shot multivibrator having the desired period or a counter circuit responding to clock pulses occurring at the Nyquist rate. It will be seen that timer circuit 452 is activated only when Mode 3 data is being transmitted. This activation takes place at the beginning of the fifth Nyquist interval of Mode 3 transmission. It will be remembered that no video data is transmitted during the first two Nyquist intervals of Mode 3 transmission and that the video data is delayed by two Nyquist intervals in delay line 80. Thus video does not reach gate 84 until the start of the fifth Nyquist interval of Mode 3 transmission. The output of timer 452 is supplied to one input of "and" gate 454. The second input of "and" gate 454 is supplied with a sampling signal by way of lead 456. This sampling signal occurs at the Nyquist rate but has a duty cycle of $\frac{1}{25}$. The output of "and" gate 454 is supplied by way of "or" gate 455 to the control input of gate 84.

Control of gate 84 for Mode 1 operation is provided by bistable multivibrator 456. The output of multivibrator 456 is connected to a second input of "or" gate 455. In its reset condition multivibrator 456 supplies a a signal to gate 84 which permits video signals to pass through gate 84. However upon activation of counter 406 a signal is supplied by way of output 410 to multivibrator 456 at the beginning of the third Nyquist interval of Mode 2 transmission which triggers multivibrator 456 and removes the activating signal from gate 84. Since delay 80 has a delay of two Nyquist intervals multivibrator 456 is not reset until two Nyquist intervals following the termination of Mode 2 transmission at input 83.

Figure 17:
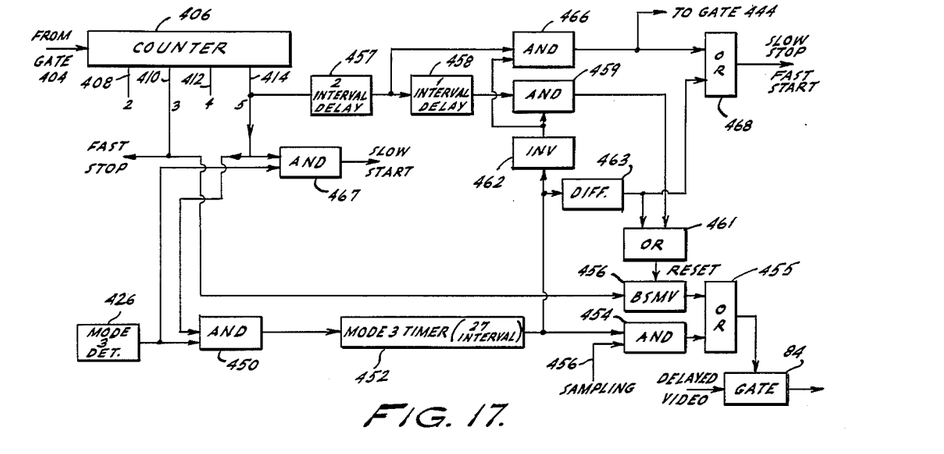
FIG. 17 is a more detailed showing of the timer shown in FIG. 16.

In FIG. 17 this is accomplished by delay means 457 and 458 which may be delay multivibrators or the like. Delay means 457 has a delay of two Nyquist intervals and delay 458 has a delay of one Nyquist interval. Since delay circuit 457 is energized at the end of the fourth (beginning of the fifth) Nyquist interval of Mode 2 transmission the output of delay 458 will occur at the end of two Nyquist intervals following completion of Mode 2 transmission.

The output of delay means 458 is supplied to the reset connection of multivibrator 456 by way of "and" gate 459 and "or" gate 461. The output of timer 452 is connected to a second input of "and" gate 459 by way of inverter 462. Thus "and" gate 459 will be in condition to pass a signal for Mode 2 operation but not for Mode 3 operation. The reset signal for Mode 3 operation is obtained from differentiator 463 which connects the output of timer 452 to a second input of "or" gate 461.

Mode 2 video data is supplied to adder 86 by way of gate 444 in the seventh interval following the start of Mode 2 reception on input 83. The control signal for gate 444 is supplied by "and" gate 466 which receives output signals from inverter 462 and delay means 457 respectively.

The horizontal and five-element vertical sweeps are stopped at the beginning of the third Nyquist interval for either Mode 2 or Mode 3 operation. The signal which accomplishes this is obtained from output connector 410 of counter 406. The sweep is restarted at the fast rate at the beginning of the seventh interval of Mode 2 operation to provide the necessary deflection signals for Mode 2 video data.

An entire block of Mode 2 video data is supplied in one Nyquist interval. If Mode 1 transmission follows Mode 2 transmission, the fast sweep will continue without interruption. If Mode 2 or Mode 3 transmission follows an interval of Mode 2 transmission the fast sweep will again be interrupted by a signal from output 410.

For Mode 3 operation the slow sweep is initiated at the beginning of the fifth interval. The slow start signal is provided by two input "and" gate 467 which is connected to output 414 of counter 406 and the output of Mode 3 detector 426. The slow sweep is stopped and the fast sweep is reinitiated at the end of the 29th interval of Mode 3 transmission. Again it will be remembered that Mode 3 transmission actually requires only 27 intervals but the Mode 3 data is delayed two Nyquist intervals in delay line 80. Thus the presentation of Mode 3 video data to cathode ray tube 92 of FIG. 6 is not completed until twenty-nine intervals after the receipt of the initial Mode 3 data on input 83. The signal which stops the slow sweep and reinitiates the fast sweep is supplied by differentiator 463. The outputs of "and" gate 466 and differentiator 463 are combined in "or" gate 468.

As shown in FIGURE 18 the pattern decoder 430 of FIGURE 16 may comprise two analog-to-digital converters 502 and 504 and a series of "and" gates. "And" gate 506 is shown in FIGURE 18, the remaining "and" gates are represented diagrammatically by the broken rectangle 508. Analog-to-digital converters 502 and 504 are circuits which will respond to the multi-level inputs supplied from gates 420 and 421 respectively and energize one of the outputs 503 and 505 in accordance with the amplitude of the input pulse. The connections from converters 502 and 504 to "and" gates 506 and 508 will depend upon the type of code selected. However in general one output 503 of converter 502 and one output 505 of converter 504 will be connected to each "and" gate. It will be recognized that if each of the converters 502 and 504 has seven output leads there are 49 possible combinations of output connections taking one connection from each of the converters at a time.

Figure 19:
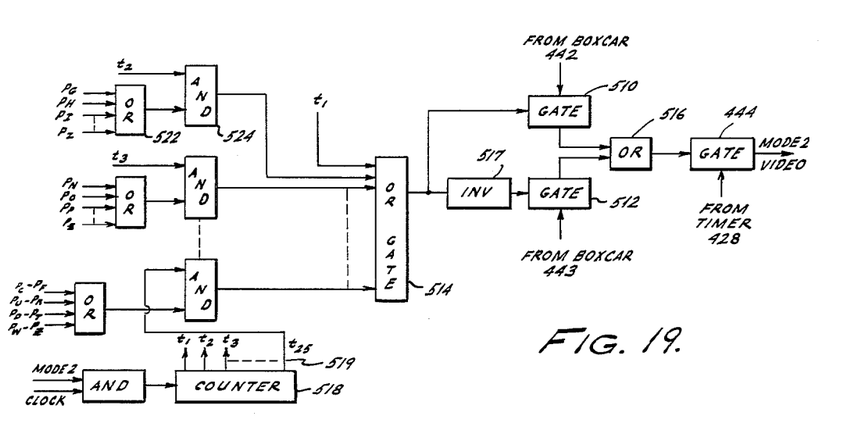
FIG. 19 is a detailed diagram of a representative portion of the Mode 2 video generator of FIG. 16.

FIGURE 19 shows in detail a representative portion of the Mode 2 video generator 440 of FIGURE 16. It will be remembered that for Mode 2 operation the synthesized video signal will vary between two levels fixed by the outputs of boxcar circuits 442 and 443 during the Nyquist interval in which Mode 2 video is supplied to cathode ray tube 90. Therefore the outputs of boxcar circuits 442 and 443 are connected to one input of gate 444 alternately by way of "and" gates 510 and 512 and "or" gate 516. The alternate operation of gates 510 and 512 is achieved by connecting the output of "or" gate 514 directly to the control input of gate 510 and to the control input of gate 512 by way of inverter 517. The outputs of gates 510 and 512 are combined in gate 516 and supplied to gate 444. It will be assumed that if no signal is supplied to any input of "or" gate 514, gate 512 is activated by inverter 517 and gate 510 is blocked.

The circuit shown at the left of gate 514 in FIGURE 19 is a logic network for supplying sequentially occurring control signals to the inputs of "or" gate 514. Counter circuit 518 shown in the lower left-hand corner of FIGURE 19 is provided with 25 output connections 519 which are energized in sequence in one Nyquist interval. These connections are identified as connections $t_1$–$t_{25}$, the subscript indicating the order in which they are energized. It will be seen from FIGURE 3 that the first element of the first column always is at the brightness represented by boxcar 442. Therefore the output connection $t_1$ of counter 518 may be connected directly to "or" gate 514. The output of "or" gate 514 in response to this signal turns gate 512 off and gate 510 on. Again referring to FIGURE 3 it will be seen that the fifth element of the first column is always at the brightness represented by the output of boxcar 443. Therefore no connection from output $t_5$ to "or" gate 514 is required. All other elements of the block may have a brightness represented by boxcar 442 or boxcar 443 depending on the pattern involved. The second element of the first column which is scanned during the interval at which output $t_2$ of counter 518 is energized has a brightness represented by boxcar 442 for patterns G through Z. Therefore the output leads $P_G$ through $P_Z$ of pattern decoder 430 are connected to one input of "and" gate 524 by way of "or" gate 522. Not more than one of the leads $P_G$–$P_Z$ will be energized for any Mode 2 transmission. The second input of "and" gate 524 is connected to the output $t_2$ of counter 518. Thus the output of "and" gate 524 will be at one value during the time the second element is scanned if any one of the patterns G through Z are being transmitted and will be at a different value for all other times and patterns. The first value of the signal from "and" gate 524 will cause gate 510 to be opened and a gate 512 is to be closed. The other value of the signal from "and" gate 524 will cause gate 512 to be opened and gate 510 to be closed. The output connections $t_3$, $t_4$ and $t_6$–$t_{25}$ of counter 518 and the output connections $P_B$ through $P_Z$ are combined in a similar fashion to control gates 510 and 512 in the third, fourth and sixth through twenty-fifth subintervals of the Mode 2 scan.

Figure 20:
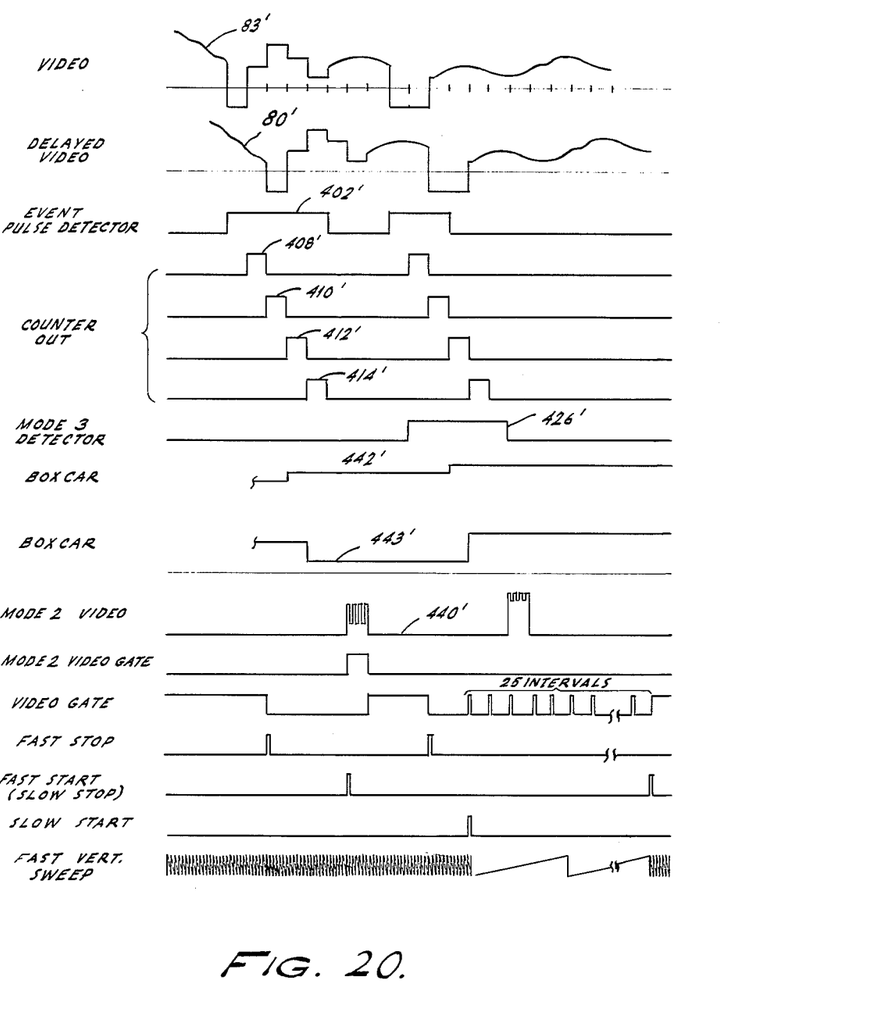
FIG. 20 is a series of waveforms which are illustrative of the operation of the system of FIGS. 16–19.

FIG. 20 is a series of waveforms taken at representative points in the system of FIG. 16. The reference numerals shown in FIG. 20 identify the points at which each waveform appears. Thus video signal 83′ is the signal appearing at input lead 83. It will be seen that this video signal is the same as the signal provided by signal combiner 48 in FIGS. 1 and 7. As explained above signal 83′ represents transmission in the following sequence: 3 blocks as Mode 1, 1 block as Mode 2, 3 blocks as Mode 1 and 1 block as Mode 3. As indicated by waveform 440′ a Mode 2 video signal may be generated in response to the reception of a Mode 3 signal. However gate 444 prevents this signal from reaching cathode ray tube 92. It should be noted that the Mode 2 video signal generated at the receiver has a bandwidth approximately twenty-five times that of the Mode 1 and Mode 3 video signals. Therefore the circuits converting the Mode 2 video generator 440 to cathode ray tube 92 should have the approximate bandwidth to pass this signal. The remainder of FIG. 20 is believed to be self-explanatory.

While the invention has been described as an image transmission system only it is to be understood that the invention may be employed to advantage where further signal processing is present. For example, the time-bandwidth reduction achieved by the invention makes it possible to record the signal representing the image on a smaller area of magnetic tape.

Therefore while there has been described what is at present considered to be the preferred embodiment of the invention it will be apparent that various modifications and other embodiments thereof will occur to those skilled in the art within the scope of the invention. Accordingly we desire the scope of the invention to be limited only by the appended claims.

We claim:

1. A system for transmitting fixed images, comprising means for scanning in succession a plurality of component areas of copy bearing the image to be transmitted to generate video signals respectively representative of variations in density within each of said areas,
    said encoding means including means for generating
    an encoded signal of a first time duration in response to area video signals which exhibit less than a selected maximum rate of variation,
    an encoded signal of a second time duration in response to area video signals which exhibit more than said selected maximum rate of variation and which correspond to one of a preselected plurality of signal waveforms representing, respectively, a corresponding plurality of preselected different area patterns.
    an encoded signal of a third time duration in response to area video signals which exhibit more than said selected maximum rate of variation and which do not correspond to one of said preselected area patterns, and
    means for combining said encoded signals to form a single output signal representative of said image.

2. A system in accordance with claim 1 wherein said first time duration is one Nyquist interval of the system.

3. A system in accordance with claim 1 wherein said first time duration is one Nyquist interval of said system and wherein said second time duration is less than $n$ Nyquist intervals, where $n$ is the number of elements within the area represented by the corresponding area video signal.

4. A system for transmitting fixed images comprising,
    photoelectric image scanning means for scanning in succession a plurality of component areas of copy bearing the image to be transmitted to generate video signals respectively representative of variations in density within each of said areas,
    detector means coupled to said scanning means and responsive to said video signals for detecting rates of change in amplitude of said video signals in excess of a preselected rate,
    data storage means for storing data representative of a preselected vocabulary of video signals which exhibit rates of change in amplitude in excess of said preselected rate,
    encoding means coupled to said data storage means, said detector means and said scanning means for generating coded signals respectively representative of video signals generated by said scanning means which correspond to video signals of said preselected vocabulary,
    re-scanning means coupled to said scanning means and said encoder means for causing said scanning means to re-scan at a slower rate, areas of said copy which generate video signals having rates of change in amplitude in excess of said preselected rate, thereby to generate re-scan video signals having rates of change in amplitude less than said preselected rate, said re-scanning means including means for generating a signal which indicates the inception of said re-scan at said slower rate,
    an output circuit, and
    gated signal coupling means coupling said scanning means, said encoding means and said re-scanning means to said output circuit.

5. In an image transmission system,
    means for scanning in succession a plurality of component areas of copy bearing the image to be encoded to generate video signals respectively representative of the density detail within each of said areas,
    detector means coupled to said scanning means and responsive to said video signals for detecting rates of change in amplitude of said video signals in excessive of a preselected rate,
    encoding means coupled to said scanning means and said detector means for generating coded signals representative of said video signals which exhibit rates of change of amplitude in excess of said preselected rate and which correspond to one of a predetermined plurality of different video waveforms,
    at least one time portion of each of said coded signals being representative solely of the position within the represented area at which a change in density occurs and at least one other time portion of each of said coded signals being representative of the density of a predetermined region of said represented area, an output circuit, gated signal coupling means for selectively coupling said scanning means and said encoding means to said output circuit, means coupling said detector means to said gated signal coupling means for controlling the operation of said gated signal coupling means in accordance with the detected rate of change in amplitude of said video signal, and re-scanning means coupled to said detector means and said scanning means for causing said scanning means to re-scan, at a rate slower than said first rate, areas of said copy which generate video signals having rates of change of amplitude in excess of said preselected rate, but which do not correspond to one of said predetermined plurality of video waveforms.

6. A system for reproducing an image from a composite signal representative of fixed images, said signal comprising at different times, a fast rate video signal, a slow rate video signal, and encoded signals respectively representative of a selected vocabulary of video signals respectively representative, in turn, of a preselected vocabulary of different image patterns, said system comprising, a source of said composite signal, decoder means coupled to said source and responsive to said encoded signals present in said composite signal for generating video signals corresponding to said vocabulary, said video signals being respectively amplitude representative of the density detail in said vocabulary of different image patterns, image generating means responsive to video signals supplied thereto for generating an image, said image generating means including (1) a reproducing element controlled by video signals supplied to said image generating means, and (2) scanning means for moving said reproducing element in a preselected pattern, gated signal coupling means coupling alternatively said source and said decoder means to said image generating means, and means coupled to said source and responsive to the reception of said slow rate video signal for decreasing for the duration of said slow rate video signal the rate of movement of said reproducing element.

7. A system according to claim 1 wherein said encoded signal of a second time duration comprises a plurality of amplitude modulated pulses, at least some of said pulses representing data other than the density of the image.

8. A system according to claim 1 wherein said encoded signal of a second time duration comprises a plurality of modulated pulses, the modulation of selected ones of said pulses representing the position of density variations within said areas and the modulation of other ones of said pulses representing the density at selected points in said areas.

9. A system according to claim 8 wherein said modulated pulses are amplitude modulated pulses.

10. A system for transmitting fixed images, comprising means for scanning in succession a plurality of component areas of copy bearing the image to be transmitted to generate video signals respectively representative of variations in density within each of said areas, encoding means coupled to said scanning means and including means for generating modulated code signals in response to area video signals which exhibit more than a predetermined rate of variation and which correspond to one of a preselected plurality of signal waveforms representing, respectively, a corresponding plurality of preselected different area patterns, each of said code signals representing a respective one of said patterns, one modulation component of each of said modulated code signals representing the position of density variations within the represented area, and a second modulation component of each of said modulated code signals representing the density at selected points in the represented area, signal transmitting means, and signal coupling means coupling said scanning means and said encoding means to said signal transmitting means, said signal coupling means including means for selectively supplying either said video signals or said modulated code signals to said signal transmitting means.

11. A system according to claim 10 wherein said modulated code signals comprise plural pulse code signals, and wherein said one modulation component comprises the modulation of selected ones of said pulses and said second modulation component comprises the modulation of other ones of said pulses.

12. A system according to claim 11 wherein said modulation components comprise amplitude modulation components.

References Cited by the Examiner

UNITED STATES PATENTS

| 2,911,465 | 11/59 | Toulon | 178—7.5 |
| 2,978,535 | 4/61 | Brown | 179—15.55 |

DAVID G. REDINBAUGH, *Primary Examiner.*